Oct. 18, 1932.   M. J. AHLGRIM   1,882,686
RAKE CLEANER
Filed April 12, 1929
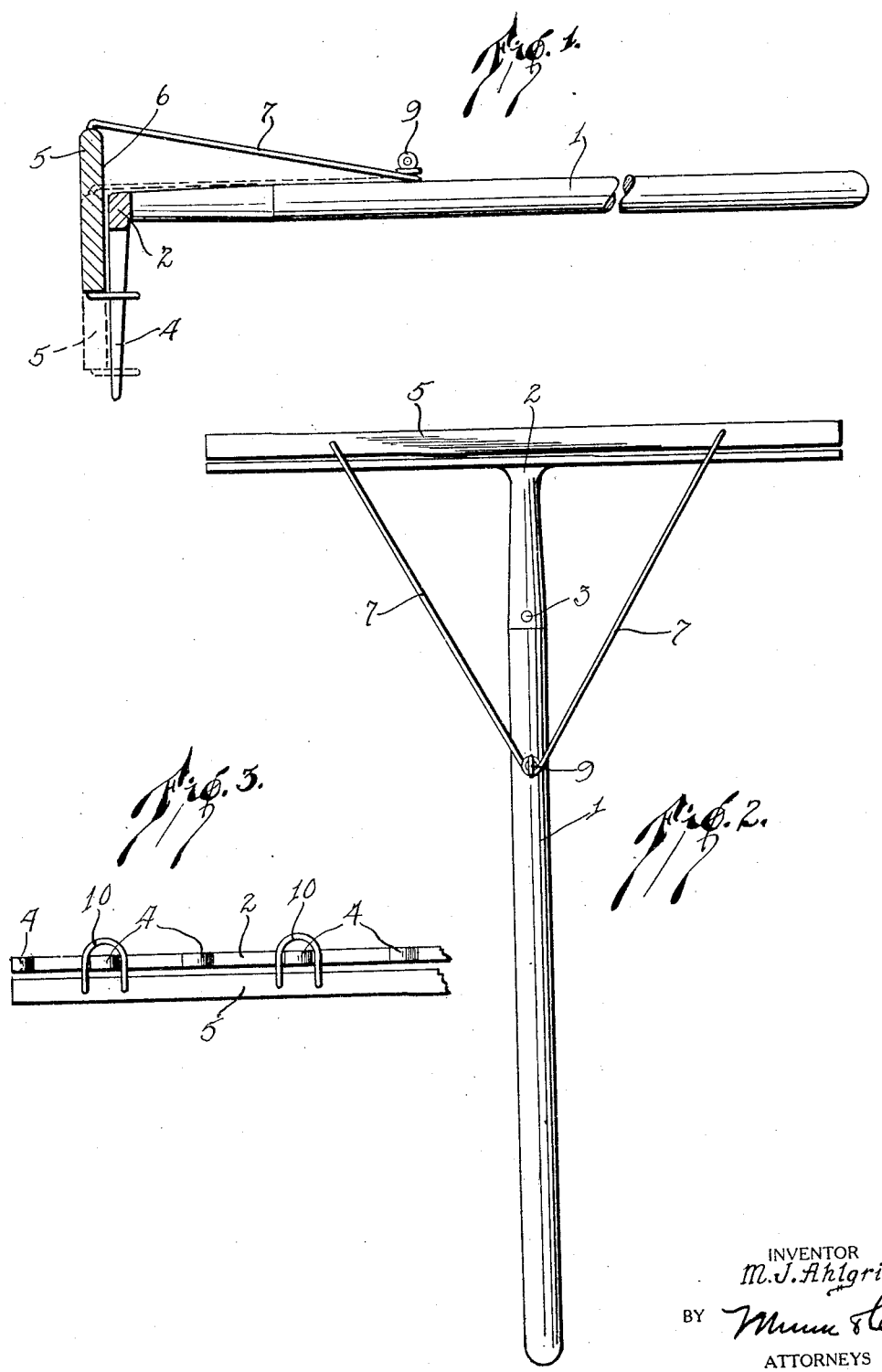
INVENTOR
M. J. Ahlgrim
BY
ATTORNEYS Patented Oct. 18, 1932

1,882,686

UNITED STATES PATENT OFFICE

MAX J. AHLGRIM, OF SHELBY, INDIANA

RAKE CLEANER

Application filed April 12, 1929. Serial No. 354,658.

My invention relates to improvements in rakes and means for cleaning the same, and it consists in the combinations, constructions and arrangements herein described and claimed.

An object of my invention is to provide a device of the type described, which consists chiefly in a detachable member which is adapted for attachment with the ordinary type of rake, and which, when in place upon the rake, automatically cleans the tines of the rake from débris, such as leaves and the like, when the rake is lifted one stroke.

A further object of my invention is to provide a device of the character described, which while performing the function of cleaning the rake, does not in any way hinder the capacity or efficiency of the rake during operation.

A further object of my invention is to provide a device of the character described, which is adapted to lie in close engagement with the rake when in an operative position, and therefore permits the introduction of the rake to narrow spaces, as under fence runners and the like.

A further object of my invention is to provide a device of the character described, which may be quickly and easily detached from the rake and replaced at will.

Other objects and advantages will appear in the following specification, and the novel features of the invention will be particularly pointed out in the appended claim.

My invention is illustrated in the accompanying drawing, forming part of this application, in which Figure 1 is a side elevation of an embodiment of my invention, a part thereof being in section, Figure 2 is a top plan view of the mechanism as shown in Figure 1, and Figure 3 is a bottom view of a part of the mechanism shown in Figure 1.

In carrying out my invention, I make use of a rake having a handle member 1, and a work engaging member 2 secured at the outermost end thereof, as by means of a rivet 3 or the like. The work engaging member 2 is of ordinary construction and consists in a body portion from which a multiplicity of depending substantially parallel tines 4 extend. The tines 4 extend substantially at right angles to the handle 1.

My improved means for cleaning the tines 4 of the work engaging member 2 from an accumulation of débris, such as dry leaves, twigs, and the like, during the use of the rake, is provided in a wooden cleaner bar 5, which extends substantially the entire length of the work engaging member 2, and which is not quite as wide as the length of the tines 4, and the thickness of the body portion of the work engaging member (see dotted lines in Figure 1).

This cleaner bar 5 is preferably constructed of hard wood about three-eighths of an inch in thickness. The bar is normally disposed in the position shown in dotted lines in Figure 1, with its inner face 6 close to the outer portion of the work engaging member 2.

Means for normally maintaining the bar in this position is provided with a V-shaped member 7 constructed of a substantially rigid metal rod bent in the form of the letter V, with an annular portion 8, as shown at the mid-point of the member. A screw eye 9 is projected through the annular portion 8 and into the handle member 1, thus securing the member 7 against longitudinal movement relative to the handle member 1, and permitting the member 7 to move upwardly to the position shown in full lines in Figure 1. The outermost ends of the member 7 are projected into and secured to the cleaner bar 5, thus maintaining the cleaner bar in certain definite relation with the work engaging member 2 at all times.

The cleaner bar 5 is provided with U-shaped members 10 fixed at the ends thereof to the cleaner bar, extending in a plane substantially transverse to the plane of the bar 5. These members 10 are arranged upon the cleaner bar so as to encompass every second one of the tines 4.

From the foregoing description of the various parts of the device, the operation thereof may be readily understood. My improved rake and means for cleaning the same operates in precisely the same manner insofar as the rake is concerned as though there were no cleaning means attached, since the cleaning mechanism is entirely automatic in operation.

When the work engaging member 2 is dropped or moved down upon, let us say, a lawn and drawn toward the operator, loose grass, leaves and the like will be gathered about the tines of the work engaging member. Certain of this cut grass, leaves, and the like will become entangled with the tines, and would not normally fall therefrom when the rake is raised.

As quickly as the rake is raised from the lawn, the cleaner bar 5 will fall into the position shown in dotted lines in Figure 1, and the members 10 passing along the tines 4, as well as the adjacent edge of the cleaner bar 5, will clear the tines of the leaves or grass which would otherwise cling thereto. The rake is then ready for a second stroke. It should be noted that as quickly as the tines 4 of the work engaging member 2 are engaged with grass or the like, that the cleaner bar 5 will be lifted by virtue of the contact with such grass or leaves, and will remain in its elevated position until the rake is raised.

Let us assume now that a large quantity of accumulated leaves or the like is found upon the tines, and that the weight of the cleaner bar 5 is not sufficient of itself to clean the tines. The operator will then quickly raise and lower the rake with a jerky movement, which will then cause the cleaner bar 5 to move with respect to the work engaging member and act as before, where movement is caused slowly by its own weight.

If it is desired to use the rake without the cleaner attachment, it is only necessary to remove the screw eye 9 and drop the members 10 out of engagement with the tines.

My invention has been defined as a rake and means for cleaning the same, but it is obvious that the cleaning bar and the means for attaching the cleaning bar to a rake is the outstanding feature of this invention. This cleaning bar may be attached to any rake of standard construction and is positively held thereupon due to the fact that the V-shaped member 7 supports the bar in normal position, and the U-shaped members 10 hold the bar against lateral displacement and in constant engagement with the tines. Furthermore, the bar 5 is disposed upon the front of the rake where it may operate efficiently without being interfered with by the gathering of the grass, leaves, or the like.

I claim:

The combination of a rake having a handle and tines, of a cleaner bar consisting of a rectangular strip of wood disposed at the end of the rake in parallelism with the tines, U-shaped guide members secured to the bottom portion of the cleaner bar and arranged to receive certain of the tines for guiding the bar in its movement, a rigid V-shaped connecting member having its extended arms secured to said cleaner bar, said rigid connection having an eye in its apex, and means arranged to pass through the eye and into the handle for securing the rigid connecting member to the handle so as to prevent longitudinal movement but providing for free movement of the cleaner bar in a direction parallel to the tines of the rake.

Signed at Chicago, in the county of Cook, and State of Illinois, this 4th day of April, A. D. 1929.

MAX J. AHLGRIM.